United States Patent [19]

Palsky et al.

[11] 4,332,131
[45] Jun. 1, 1982

[54] APPARATUS AND PROCESS OF MANUFACTURING A METAL CORD

[75] Inventors: Alain Palsky, Savonnieres; Guy Vella, Bar le Duc, both of France

[73] Assignee: Rhone Poulenc Textile, Lyons, France

[21] Appl. No.: 272,345

[22] Filed: Jun. 10, 1981

Related U.S. Application Data

[63] Continuation of Ser. No. 68,720, Aug. 22, 1979, abandoned.

[30] Foreign Application Priority Data

Aug. 22, 1978 [FR] France ................ 78 24532

[51] Int. Cl.$^3$ .............. D07B 1/06; D07B 3/00; D02G 3/48
[52] U.S. Cl. ................................. 57/213; 57/13; 57/15; 57/215; 57/902
[58] Field of Search .............. 57/3, 6, 13, 15, 12, 57/58.52, 58.7, 58.61, 212, 213, 215, 218, 219, 311, 902; 152/356 R, 359

[56] References Cited

U.S. PATENT DOCUMENTS

| | | | |
|---|---|---|---|
| 416,189 | 12/1889 | Stone | 57/213 X |
| 3,147,580 | 9/1964 | Blaisdell et al. | 57/58.7 |
| 3,358,435 | 12/1967 | Peene et al. | |
| 3,362,147 | 1/1968 | Curtis | |
| 3,538,702 | 11/1970 | Wolf et al. | 57/902 X |
| 3,996,733 | 12/1976 | Holmes | 57/215 |
| 4,087,956 | 5/1978 | Gre | 57/58.7 X |

FOREIGN PATENT DOCUMENTS 1325662  3/1963  France .
819680  9/1959  United Kingdom .

*Primary Examiner*—Donald Watkins
*Attorney, Agent, or Firm*—Sherman & Shalloway

[57] ABSTRACT

A compact single-strand cord consisting of at least nine single wires of the same diameter twisted together in the same direction and with the same pitch, characterized in that, in cross-section, the cord has the shape of a compact stack of polygonal, preferably hexagonal, contour. The cord can be used for reinforcing rubber articles or elastomeric articles, in particular for reinforcing tires.

The method of manufacture of the cord includes unwinding the wires from coils each consisting of a single wire. The wires are delivered by positive slip-drive rollers to a means for regrouping and a strand-laying means. The wires are assembled in a grid and die and twisted by an assembling twister. The wires are then guided through a double twist path loop, overtwisted, straightened and collected on a capstan.

The machine for performing the process includes an unwinding means in the form of a plurality of feed bobbins, a positive slip-drive roller system, means for regrouping the advanced wires including a grid and a die, a revolving assembling twister and a spindle means including a loop and stationary cradle carrying an overtwisted, straightener and capstan for collecting the cord.

9 Claims, 14 Drawing Figures

APPARATUS AND PROCESS OF MANUFACTURING A METAL CORD

This is a continuation, of application Ser. No. 68,720, filed Aug. 22, 1979, now abandoned.

BACKGROUND OF THE INVENTION

1. Field of the Invention

The present invention relates to metal cords, such as those used for reinforcing tires and to a process for the manufacture of the metal cords.

2. Description of the Prior Art

Metal cords, including those used for reinforcing tires, are generally manufactured in two steps: the first step is the stranding and consists, starting from single wires, in twisting the said wires together in a given direction, and the second step is the strand-laying which consists in twisting the strands together, or twisting one strand together with single wires, in the same direction or in the opposite direction to the twisting used in stranding, but, in general, to a different extent.

This sequence of operations is long and results in relatively high manufacturing costs.

A process for the manufacture of a metal wire cord is also known from Addition No. 88,666 to French Pat. No. 1,340,702, which process consists in passing the wires of two or more groups of wires, which groups are each composed of two to six wires inclusive, wound on a single bobbin, from their respective bobbins through a twisting apparatus which forms a cord from the wires, and then onto a receiving device. This gives a single-strand cord in which all the wires are twisted in the same direction and to the same extent. A cord of this type can be used in tire reinforcements. In the process, the use of a rotating twister-collector is envisaged, which is located upstream of the twisting apparatus and the function of which is to draw off the appropriate lengths of wire so as to obtain the arrangement which the wires must have in the finished cord. An over-twisting device is also provided in order to give a temporary over-twist by means of false twist, which makes it possible to set the true twist and to obtain an inert cord.

This process makes it possible to dispense with the stranding operation. However, it exhibits certain disadvantages. Since the feed comes from groups of wires, each group being wound on a bobbin, it is first necessary to make up coils of grouped wires and this constitutes an additional operation involving grouping onto a bobbin. However, this grouping operation can be avoided by collecting a group of wires directly at the outlet of a multiple wire-drawing device; however, the field of application of the process is then restricted and dependent on the use of multiple wire-drawing devices, this use being far from widespread. Furthermore, the wires of each group are drawn off simultaneously and unwind at the same speed.

Now if the finished cord is to be compact, the wires must not have the same length in accordance with their distance from the axis, that is to say in accordance with the successive layers to which they belong. In the patent in question, the simultaneous unwinding means that the wires have the same length. This results in non-uniformities along the cord. In an attempt to limit these defects, positioning means (positioning guides and perforated plates), located between the feed bobbins and the twisting apparatus, are provided. However, apart from making the device more complex, these means do not succeed in eliminating the nonuniformity defects.

This process produces cords of which the properties, in particular the tensile strength, can vary along the cord because of the lack of uniformity in positioning the strands.

Now, metal cords for reinforcing tires must possess both a high tensile strength and a good fatigue resistance, coupled with the smallest possible diameter. In fact, in the making of calendered plies, the diameter of the cord determines the thickness of the ply. A thin ply has a dual advantage: from the economic point of view the amount of rubber used is smaller and the cost of the ply is reduced, and, from the technical point of view, a thinner ply provides a better resistance to heat.

An attempt has been made to reconcile these contradictory characteristics in specific manufactured products.

Thus, U.S. Pat. No. 3,358,435 described a cord of the 3+6 type, that is to say with 3 core wires and 6 outer wires, which exhibits improved compactness. The 6 wires of the outer layer are laid around the core in the same direction and with the same pitch as the latter; however, in order to make the cord compact, these 6 wires consist of two groups of three wires, the diameter of the wires being different in the two groups and different from the diameter of the core wires. In this manner, while retaining an identical external diameter to that of the conventional 3+6 cord, 3 wires of larger diameter are used for the outer layer and this results in a better packing and a higher tensile strength. However, the improvement in the tensile strength only results from the increase in the linear mass, which constitutes a handicap in the tire. Moreover, this method of construction is restricted to the 3+6 structure. Furthermore, it necessitates the use of cores of different diameters, which results in a deformed cord, it is expensive, it carries the risk of mixing the wires together, and, in particular, it requires a device for the very strict positioning of the strands, any transposition of two outer wires in the process leading to a poor result.

SUMMARY OF THE INVENTION

The present invention proposes to provide a metal cord which possesses a good compactness combined, inter alia, with good tensile strength and fatique resistance, while being able to be manufactured by a simple process on existing machines which have undergone a few minor modifications.

It relates to a single-strand metal cord for reinforcing rubber articles, such as tires, which cord consists of wires of the same diameter, twisted together in the same direction and to the same extent, characterised in that, in cross-section, it has the shape of a compact stack of polygonal contour, which is uniform in the lengthwise direction.

This cord comprises at least nine single wires, but there is no upper limit to the number of wires. In practice, the cords advantageously consist of 9 to 52 wires of the same diameter. The preferred products are cords having 9, 10, 12, 14, 19, 24, 27, 28, 30, 37, 44, 48 or 52 wires for reasons of geometry. In fact, for wires having identical diameters, the above numbers correspond to arrangements of maximum compactness, in which the wires arranged in concentric layers are all tangential to one another, including those in the outer layer, the whole being inscribed as completely as possible in a circle.

These cords are intended to replace the earlier products which comprised the same number of wires but were obtained in two steps, namely stranding and strand-laying. The assembling twist of the single wires may or may not be the same as the strand-laying twist of the earlier products obtained in two steps.

The cords are constructed around a central structure based on 1, 2, 3 or 4 wires.

The shape of the cross-section varies with the number of wires forming the cord, but it is essentially the shape of an irregular hexagon.

In the preferred constructions mentioned by way of example, the number of wires on two consecutive sides of the hexagon only varies by one unit.

For a given diameter of monofilament, the compactness of the cord manifests itself in a lower diameter of the cord. This is particularly advantages where calendered plies are manufactured, which are subsequently used for making up carcasses or belts of tires.

Since the calendering rubber with which the cords are coated is very expensive, its thickness is calculated with precision, to about 1/100th of a millimeter. Thus, any reduction in the diameter of the cord makes it possible to reduce the thickness of the calendered ply and has an immediate beneficial effect on the cost of the said calendered ply. Furthermore, since the ply is thinner, it resists a temperature rise in the tire better. In addition, the packing of the cords in the ply can be increased, thereby increasing the strength of the ply per unit of width.

The cords according to the invention furthermore have an increased breaking load for a given number of wires of the same type. This phenomenon is due to better cohesion between the individual wires which are all oriented in the same direction and which participate more uniformly in the tensile force, this cohesion being uniform along the cord.

The combination of these two properties, namely a higher breaking load and greater compactness, manifests itself in a greater possibility of reinforcement per unit of width of the calendered ply, where the cord is used in tires.

The cords furthermore have a very markedly improved fatigue resistance, which is a vital factor in the use of the cords in tires, and a greater flexibility than the conventional stranded cords.

The other properties, such as adhesion to rubber, remain unchanged compared to the conventional cords.

The present invention also relates to a process for obtaining the cord defined above.

This is a process of manufacture of a single-strand cord from non-twisted single metal wires, in a single stage, according to which the wires unwound from feed means are brought to a means of regrouping, and then to a strand-laying device comprising, at its inlet, an assembling twister which imparts to the assembly of wires a twist close to the nominal twist, the finished cord being collected on a receiving device, the process being characterised in that the wires are fed from coils each consisting of a single wire.

The unwinding tension of each single wire is so adjusted as to impart the twist efficiently at the twister, cause the strand-laying twist to travel back efficiently, and thus give maximum twist at all points of the path of the cord.

The means of regrouping can consist of grids (distributing grids) suitably located, the grids being used in accordance with the number of layers of wires in the cord, and the various strands passing through the holes in the grids.

The strand-laying device can be a simple-twist or double-twist device, or a device of the tubular type. Advantageously, a double-twist device is used, in which the strand-laying spindle is of the conventional type.

To obtain a compact product, with good location of the wires, and free from flaws such as loops and the like, it is necessary that all the wires should, at the point of assembly, be distributed in exactly the length which they are to have in the finished cord. It is this which is the function of the assembling twister, which forms successive layers of wires and imparts to the cord a twist identical to its final twist. Since the twister works by false twist, the twist imparted upstream would normally be destroyed downstream if it was not taken up by the strand-laying spindle. However, in order to ensure the quality of the product, it is necessary that the cord should, as from when it is assembled, retain its twist to the greatest possible extent along its entire path until it reaches the receiving device. Thus, if a double-twist strand-laying device is used, where the twist is imparted in two stages, means are provided which facilitate the travelling-back of the twist as far as the inlet of the strand-laying spindle, that is to say as far as the outlet of the draw-off twister. In this way, the untwisting of the assembly of wires downstream of the draw-off twister is immediately compensated by the travelling-back of the true twist imparted by the strand-laying spindle.

Still with the object of good location of the wires in the product, and good travel-back of the twist, provisions are made to lower and adjust the tension of the single wires at the unwind stage. For this purpose, motor-driven unwinding means, which may or may not be controllable, are used, which consist, for example, of positively driven rollers revolving at a higher speed than the forward travel of the wires. The said rollers make it possible to regulate the tensions at the assembly point and thus facilitate the location of the wires of the various layers. It is possible to use rollers which may or may not be independent of one another and are allotted to individual wires or groups of wires.

To set the twist of the cord and obtain an "inert" product it is possible, in a known manner to subject the cord to a termporary over-twist by false twist and/or to straighten the cord on suitable godets, preferably when it has received its final configuration. This operation can be carried out continuously on the machine or can be carried out discontinuously, thus constituting a separate subsequent operation.

By virtue of the characteristics of the above process, namely individual draw-off of each wire to the correct length and with the correct tension, imparting of the final twist at the assembly point, and maintenance of the twist over the entire path downstream from the twister, the wires locate themselves individually in the best way in the free spaces, resulting in compact and uniform cords. Since this compact structure is required as from leaving the draw-off twister, it is not disturbed over the subsequent path of the cord, by virtue of the effect of the travel-back of twist.

Finally, the strand-laying assembly may or may not include a lapping spindle integral with the machine.

BRIEF DESCRIPTION OF THE DRAWINGS

The examples and figures which follow are given to illustrate the invention and do not imply a limitation.

DETAILED DESCRIPTION OF THE INVENTION

Figure 1:
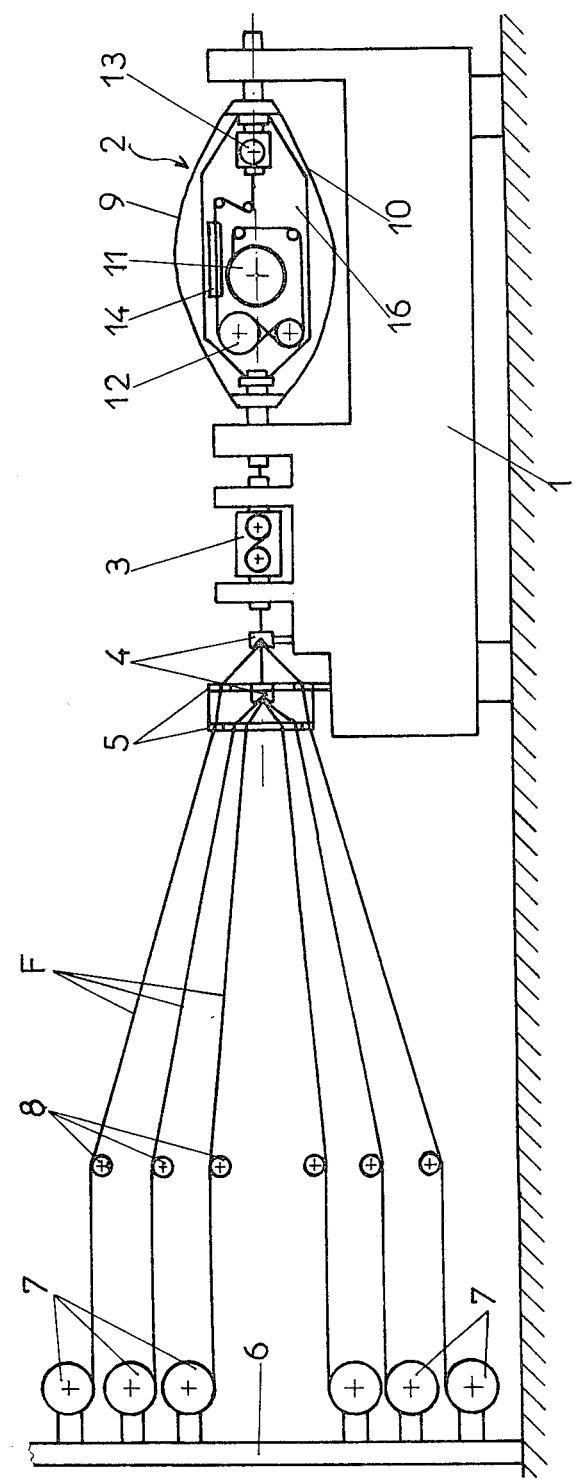
FIG. 1 illustrates a method of carrying out the process according to the invention.

FIG. 1 represents a strand-laying device for carrying out the process according to the invention.

It comprises, on the one hand, a framework 1 carrying a double-twist strand-laying spindle 2, an assembling twister 3, two assembling dies 4 and distributing grids 5, and on the other hand, means of feeding single wires F, the means essentially consisting of a creel 6 carrying bobbins of single wires 7. The creel 6 carries a number of bobbins at least equal to the number of wires constituting the cord, only six of the bobbins being shown in the drawing. In order to adjust the tension of the wires at the point of assembly in the die 4, the wires are positively driven by unwind rollers 8. The wires F can slip on the rollers 8, so that the speed of draw-off of each wire is determined by a capstan 12 and the assembling twister 3 in accordance with the position of each wire in the cord.

The strand-laying spindle 2 is a double twist windup spindle, having a double loop 9–10. One of the loops serves to guide the cord and defines a path of the double twist type, while the other loop is provided for balancing purposes. Inside the space defined by the loops is provided a cradle 16 which is not movable and which carries a receiving bobbin 11, with reciprocating means of distribution of the cord, a capstan 12, an over-twister 13 and a straightener 14. The capstan 12 serves to draw the cord C. The over-twister serves to set the strand-laying twist by applying a temporary overtwist by false twist, making it possible to exceed the elastic limit. The straightener 14 also plays a part in fixing the twist. It is also possible to fit onto the path of the cord any device which is in itself known and which allows the twist to travel back towards the assembly zone.

The process is carried out as follows with the device of FIG. 1:

The single wires F and the cord C which is being formed and subsequently has been formed are drawn by the capstan 12, which determines the speed of advance of the cord. From the feed bobbins 7, the single wires F pass around rollers 8 which drive the wires positively, but allow the possibility of slip, the speed of each being adjusted so as to provide the necessary tension at the assembling dies 4. It is also possible to have identical speeds and adjust the tensions by varying the number of turns of the wires over the said rollers. The wires pass successively through the distributing grids 5 and the assembling dies 4 and then, in the form of a cord, into the assembling twister 3. For a given speed of advance of the cord determined by the capstan 12, the speed of rotation of the draw-off twister 3 is set so that this component imparts to the cord an assembling twist equal to its nominal twist. Thus, at the twister 3 the cord already has its final twist configuration and the said twister draws off each wire to the correct length, in accordance with the position which it is to occupy in the cord. At the outlet of the twister 3, the cord enters the spindle 2 and describes a path of the double twist type in one of the two loops 9–10, equipped with means which facilitate the travel-back of the twist. On leaving the said loop, the cord is subjected to an over-twist by means of false twist applied by the over-twister 13, in order to obtain an "inert" cord, free from twist reaction, and is then straightened in the straightener 14 and, after passing over the capstan 12, is collected on the bobbin 11.

As already indicated in the general description, the process makes it possible to obtain a cord having the required properties, namely improved compactness, uniformity, breaking load and flexibility. These properties are achieved by the combination of the following main points of the process:

individual draw-off of each wire, to the correct length, and imparting of final twist at the assembly stage, by means of the assembling twister 3, positioning of the wires in the cord being formed, facilitated by the drive rollers 8 which make it possible to lower and adjust the assembling tension, and maintenance of the twist imparted by the twister 3 over the entire path, by virtue of the travel-back of twist imparted by the spindle as far as the outlet of the said twister 3.

Thus, the wires are placed simultaneously and individually in the best way in the free spaces, which results in compact cords. Since this compact structure is acquired as from leaving the twister 3, it is not disturbed over the subsequent path of the cord, and this contributes to good uniformity. Furthermore, the individual drawing-off of the wires makes it possible to reduce the precautions regarding the positioning during assembly. It is simply necessary to provide a particular guide for the basic structure, and the other wires automatically place themselves around this basic structure.

FIGS. 2 to 12 show, in cross-section, cords according to the invention, consisting of wires of identical diameters, which cords can be obtained by the process described above. It will be noted that the cords are in the form of compact stacks, and the wires all touch. These stacks or arrangements are in the form of concentric layers deposited around a central basic structure (shown shaded) which structure may consist of 1, 2, 3 or 4 wires.

Figure 2:
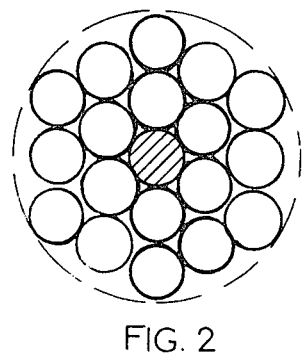
FIGS. 2 to 12 schematically represent cross-sections of cords according to the invention.
Figure 3:
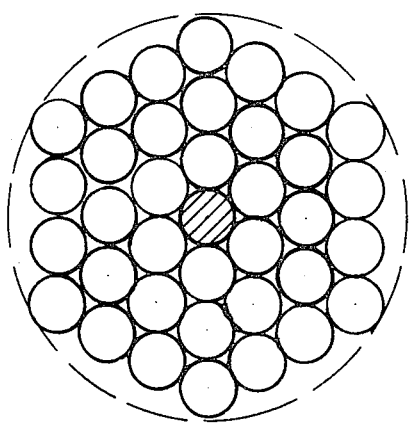

FIGS. 2 and 3 represent cords constructed around a central basic structure of one wire. The cord according to FIG. 2 comprises 19 wires; it is of the (1+6+12) type. The cord according to FIG. 3 comprises 37 wires; it is of the (1+6+12+18) type. The numbers 6, 12 and 18 denote the number of wires which the various layers around the central basic structure comprise.

Figure 4:
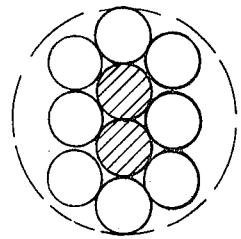
Figure 5:
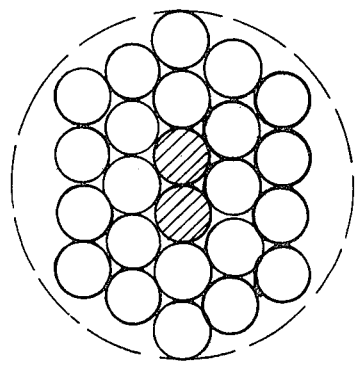
Figure 6:
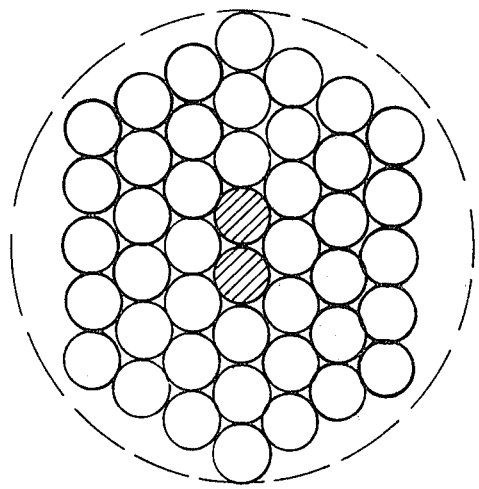

FIGS. 4, 5 and 6 represent cords constructed around a central basic structure of two wires. The cord according to FIG. 4 comprises 10 wires; it is of the (2+8) type. The cord according to FIG. 5 comprises 24 wires; it is of the (2+8+14) type. The cord according to FIG. 6 comprises 44 wires and is of the (2+8+14+20) type.

Figure 7:
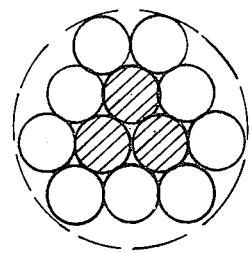
Figure 8:
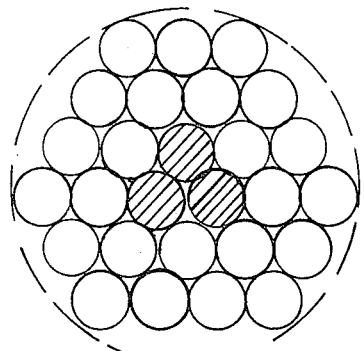
Figure 9:
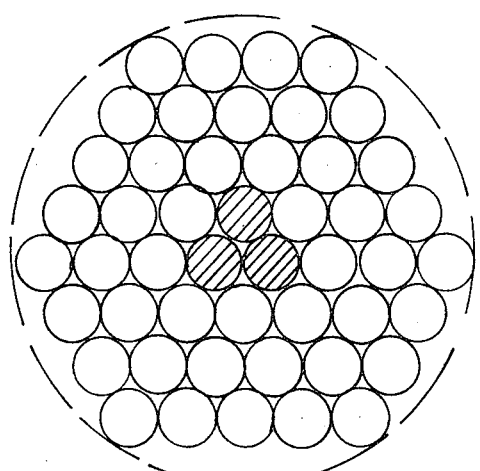

FIGS. 7, 8 and 9 represent cords constructed around a basic central structure of three wires. The cord according to FIG. 7 comprises 12 wires; it is of the (3+9) type. The cord according to FIG. 8 comprises 27 wires; it is of the (3+9+15) type. The cord according to FIG. 9 comprises 48 wires and it is of the (3+9+15+21) type.

Figure 12:
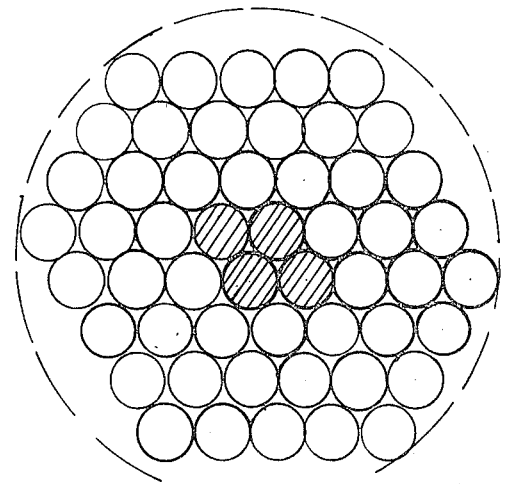
Figure 11:
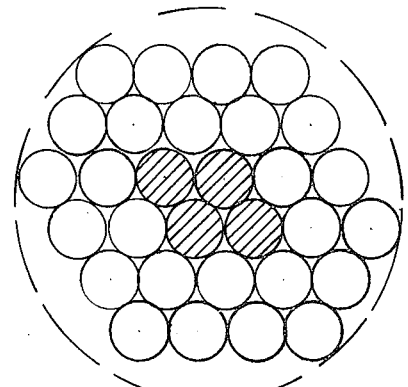
Figure 10:
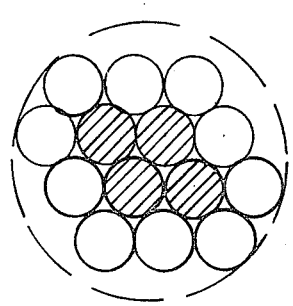
Figure 13:
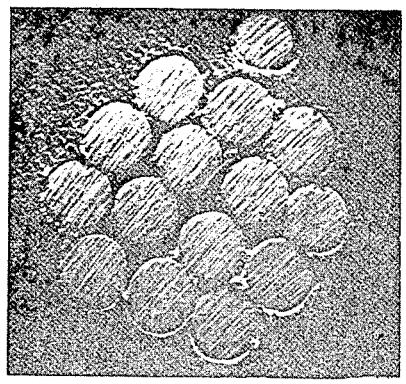
FIGS. 13 and 14 represent actual cross-sections of two cords, viewed under a scanning electron microscope.

FIGS. 10, 11 and 12 represent cords constructed around a central basic structure of 4 wires. The cord according to FIG. 10 comprises 14 wires; it is of the (4+10) type. The cord according to FIG. 11 comprises 30 wires; it is of the (4+10+16) type. The cord according to FIG. 12 comprises 52 wires and it is of the (4+10+16+22) type. FIG. 13 is a cross-sectional view, under an electron microscope, of a cord of the (4+10) type, consisting of wires of 0.22 diameter, lapped with a wire of 0.17 diameter.

Figure 14:
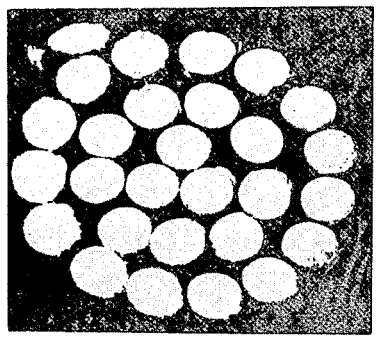

FIG. 14 is a cross-sectional view, under an electron microscope, of a cord of the (3+9+15) type, consisting of wires of 0.22 diameter, lapped with a wire of 0.15 diameter.

The examples which follow show the good quality of the cords according to the invention. The object is to compare the characteristics and properties of the cords according to the invention with the conventional cords comprising the same number of wires of the same nature.

Nomenclature

In the examples, the nomenclature of the cords conforms to the rules illustrated by the following examples:

(a) A 7×4×0.22+0.15 cord; SZS twists; 9.5/18/3.5 pitch

The cord thus designated is a cord of 7 strands, each strand consisting of 4 single wires, each of 0.22 mm diameter; the cord is lapped with a wire of 0.15 mm diameter. S, Z, S twist signifies: S stranding twist, Z strand-laying twist, S lapping twist. 9.5/18/3.5 pitch signifies: stranding pitch 9.5 mm, strand-laying pitch 18 mm, lapping pitch 3.5 mm.

(b) A (3+9)×0.175+0.15 cord; SSZ twists; 5/10/3.5 pitch

The cord thus designated consists of a central strand of 3 wires of 0.175 mm diameter, assembled by S twist with a pitch of 5 mm, the said strand being surrounded by 9 wires of 0.175 mm diameter wound with S twist around the strand, with a pitch of 10 mm; the cord is lapped with a wire of 0.15 mm diameter, with a Z twist, and a pitch of 3.5 mm.

The comparisons are made in respect of the following characteristics:
   diameter (expressed in millimeters),
   breaking load (expressed in daN-decaNewton), apparent strength = $\dfrac{\text{breaking load}}{\text{apparent cross-section}}$ (expressed in $mPa$ - megaPascal).

Taber rigidity (expressed in Taber units) measured on an apparatus in accordance with U.S. Pat. Nos. 2,465,180 and 2,063,275, and
   fatigue (measured in kc-kilocycles, on a SODETAL machine, trade code SFA 10).

In all the examples, wires produced from the same type of steel containing 0.7% of carbon, and commonly used in tyres, are employed. These examples demonstrate the great improvement in the characteristics and properties of the cords according to the invention, namely compactness, breaking load, flexibility and fatigue resistance, compared to relatively tight cords of the (3+9) or (3+9+15) type, but above all compared to constructions of the 7×4 type (see Examples I, II, III and IV).

In all the cases, the other properties of the cords, such as adhesion to the rubber, remain unchanged compared to stranded cords.

When using the cords in a calendered ply, these improvements manifest themselves in the important advantages which have been mentioned in the general description. Coupled with the advantages concerned with the properties of the product is the simplification of the process of manufacture. The said process, which is a single-stage process, eliminates the stranding stage and also the prior grouping on bobbins stage of the earlier processes; it is thus less expensive.

Though the invention is particularly advantageous in the case of cords for the reinforcement of rubber articles such as tires, the invention is also applicable to metal cords intended for any other uses.

EXAMPLE I

Cords Nos. 1 to 4, of which Nos. 2 and 4 are according to the invention and Nos. 1 and 3 are conventional cords. The example concerns cords of 9 wires.

| Characteristics | (1) (2+7)×0.22+0.15 Designation Twists SSZ Pitch 6.3/12.5/3.5 | (2) 1×9×0.22 +0.15 SZ 12.5/3.5 | Comparison of (2) with (1) rounded-off values in % | (3) (2+7)×0.22 not lapped SS 6.3/12.5 | (4) 1×9×0.22 not lapped S 12.5 | Comparison of (4) with (3) rounded-off values in % |
|---|---|---|---|---|---|---|
| Final product diameter | 1.07 | 1.04 | −3 | 0.82 | 0.80 | −2 |
| Breaking load | 93 | 97 | +4 | 95 | 99 | +4 |
| Apparent strength | 1,035 | 1,142 | +10 | 1,802 | 1,969 | +9 |
| Taber rigidity | 39 | 37 | −5 | 29 | 28 | −3 |
| Fatigue | 9.5 | 11.5 | +21 | 10 | 12 | +20 |

EXAMPLE II

Cords Nos. 5 to 8, of which Nos. 6 and 8 are according to the invention and Nos. 5 and 7 are conventional cords. The example concerns cords of 12 wires.

| Characteristics | (5) (3+9)×0.175+0.15 Designation Twists SSZ Pitch 5/10/3.5 | (6) 1×12×0.175+0.15 SZ 10/3.5 | Comparison of (6) with (5) rounded-off values in % | (7) (3+9)×0.175 not lapped SS 5/10 | (8) 1×12×0.175 not lapped S 10 | Comparison of (8) with (7) rounded-off values in % |
|---|---|---|---|---|---|---|
| Final product diameter | 0.96 | 0.92 | −4 | 0.74 | 0.71 | −4 |
| Breaking load | 66 | 68 | +3 | 67 | 70 | +4 |
| Apparent strength | 912 | 1,022 | +12 | 1,561 | 1,768 | +13 |
| Taber rigidity | 21 | 20 | −5 | 17 | 16 | −6 |

-continued

|                 |                    | (5)<br>(3 + 9) × 0.175<br>+ 0.15 | (6)<br>1 × 12 ×<br>0.175 + 0.15 | Comparison<br>of (6)<br>with (5) | (7)<br>(3 + 9) × 0.175<br>not lapped | (8)<br>1 × 12 × 0.175<br>not lapped | Comparison<br>of (8)<br>with (7) |
|---|---|---|---|---|---|---|---|
| Characteristics | Designation<br>Twists<br>Pitch | SSZ<br>5/10/3.5 | SZ<br>10/3.5 | rounded-off<br>values in % | SS<br>5/10 | S<br>10 | rounded-off<br>values in % |
| Fatigue |  | 25 | 35 | +40 | 30 | 40 | +33 |

EXAMPLE III

Cords Nos. 9 to 12, of which Nos. 10 and 12 are according to the invention and Nos. 9 and 11 are conventional cords. The example concerns cords of 27 wires.

|                 |                    | (9)<br>(3 + 9 + 15) ×<br>0.175 + 0.15 | (10)<br>1 × 27 ×<br>0.175 + 0.15 | Comparison<br>of (10)<br>with (9) | (11)<br>(3 + 9 + 15 ×<br>0.22 + 0.15 | (12)<br>1 × 27 ×<br>0.22 + 0.15 | Comparison<br>of (12)<br>with (11) |
|---|---|---|---|---|---|---|---|
| Characteristics | Designation<br>Twists<br>Pitch | SSZS<br>5/10/16/3.5 | ZS<br>16/3.5 | rounded-off<br>values in % | SSZS<br>6.3/12.5/18/3.5 | ZS<br>16/3.5 | rounded-off<br>values in % |
| Final product diameter |  | 1.36 | 1.34 | −1 | 1.65 | 1.63 | −1 |
| Breaking load |  | 170 | 182 | +7 | 266 | 282 | +6 |
| Apparent strength |  | 1,170 | 1,290 | +10 | 1,244 | 1,335 | +7 |
| Taber rigidity |  | 55 | 54 | −2 | 109 | 97 | −11 |
| Fatigue |  | 26 | 29 | +11 | 11 | 12 | +9 |

EXAMPLE IV

Cords Nos. 13 to 16, of which Nos. 14 and 16 are according to the invention and Nos. 13 and 15 are conventional cords. The example concerns cords of 28 wires.

|                 |                    | (13)<br>7 × 4 ×<br>0.175 + 0.15 | (14)<br>1 × 28 ×<br>0.175 + 0.15 | Comparison<br>of (14)<br>with (13) | (15)<br>7 × 4 ×<br>0.22 + 0.15 | (16)<br>1 × 28 ×<br>0.22 + 0.15 | Comparison<br>of (16)<br>with (15) |
|---|---|---|---|---|---|---|---|
| Characteristics | Designation<br>Twists<br>Pitch | SZS<br>10/18/3.5 | ZS<br>16/3.5 | rounded-off<br>values in % | SZS<br>9.5/18/3.5 | ZS<br>16/3.5 | rounded-off<br>values in % |
| Final product diameter |  | 1.47 | 1.37 | −7 | 1.80 | 1.66 | −8 |
| Breaking load |  | 176 | 187 | +6 | 273 | 290 | +6 |
| Apparent strength |  | 1,037 | 1,268 | +22 | 1,073 | 1,340 | +25 |
| Taber rigidity |  | 73 | 61 | −16 | 140 | 107 | −23 |
| Fatigue |  | 15.3 | 28.5 | +86 | 7.7 | 12.3 | +60 |

What is claimed is:

1. A single strand steel cord for reinforcing rubber articles such as tires, said cord comprising from nine to 52 single steel wires of the same diameter, twisted together in the same direction and with the same pitch, said twisted wires having a cross-sectional shape of a compact stack of polygonal contour, said cross-sectional shape being uniform along the entire length of the cord, said wires being disposed in at least one concentric layer of outer wires arranged around a central basic structure of 1, 2, 3 or 4 inner wires, all of the wires of said central basic structure and of each concentric layer, except the outer most concentric layer, tangentially contacting six adjacent wires, the wires in the outermost concentric layer, between the wires forming the corners of said polygonal contour, tangentially contacting four adjacent wires, and the wires forming said corners tangentially contacting three adjacent wires, whereby the mechanical properties of said cord, including breaking load, rigidity and fatigue, are uniform in the lengthwise direction.

2. The cord according to claim 1 wherein said cross-sectional shape has a hexagonal contour.

3. The cord according to claim 2 wherein the cord consists of two or three concentric layers of outer wires arranged around a central basic structure of one inner wire.

4. The cord according to claim 2 wherein said cord consists of one, two or three concentric layers of outer wires arranged around a central basic structure of two inner wires.

5. The cord according to claim 2 wherein said cord consists of one, two or three concentric layers of outer wires arranged around a central basic structure of three inner wires.

6. The cord according to claim 2 wherein said cord consists of one, two or three concentric layers of outer wires arranged around a central basic structure of four inner wires.

7. A method of making a single-strand steel cord comprising a central basic structure of inner steel wires and at least one concentric layer of outer steel wires arranged around the central basic structure, said cord being formed from single non-twisted steel wires in a single stage, said method comprising the steps of:
 (a) unwinding without twist, the wires from coils each consisting of a single wire;
 (b) delivering by positive slip-drive rollers the unwound wires to a means for regrouping and then to a strand-laying device comprising a double twist spindle;
 (c) regrouping the delivered wires in a grid followed by a die to form an assembly of wires, said die comprising specific guiding means for the central basic structure of said cord;

(d) twisting the assembled wires in an assembling twister at a speed which imparts a false twist close to a nominal twist;

(e) guiding the twisted wires through a double twist path loop, the wires being drawn by a capstan;

(f) overtwisting the guided wires;

(g) straightening the overtwisted wires; and (h) collecting the straightened wires on a bobbin located immediately after said capstan.

8. The process according to claim 7 wherein the positive drive of the wires is performed by an individual means for each wire.

9. The process according to claim 7 wherein the positive drive of the wires is performed by a means common to a group of wires.

* * * * *